US007950033B2

(12) United States Patent
Pierre et al.

(10) Patent No.: US 7,950,033 B2
(45) Date of Patent: May 24, 2011

(54) UTILIZATION OF RELATIONAL METADATA IN A TELEVISION SYSTEM

(75) Inventors: Ludovic Pierre, San Francisco, CA (US); Steven Szymanski, Mountain View, CA (US); Debra Hensgen, Redwood City, CA (US)

(73) Assignee: Opentv, Inc., San Francisco, CA (US)

( * ) Notice: Subject to any disclaimer, the term of this patent is extended or adjusted under 35 U.S.C. 154(b) by 1809 days.

(21) Appl. No.: 09/974,142

(22) Filed: Oct. 10, 2001

(65) Prior Publication Data
US 2003/0070183 A1 Apr. 10, 2003

(51) Int. Cl.
H04N 5/445 (2011.01)
(52) U.S. Cl. .............. 725/39; 725/40; 725/44; 348/465; 709/219
(58) Field of Classification Search .................. 725/135, 725/136, 120, 37–61, 131–134, 139–142; 348/465, 468, 473, 476, 722; 709/217–231
See application file for complete search history.

(56) References Cited

U.S. PATENT DOCUMENTS

| | | | |
|---|---|---|---|
| 5,818,441 A | | 10/1998 | Throckmorton et al. |
| 5,982,445 A | | 11/1999 | Eyer et al. |
| 6,317,885 B1 | * | 11/2001 | Fries ............................... 725/109 |
| 6,442,755 B1 | * | 8/2002 | Lemmons et al. .............. 725/47 |
| 6,536,041 B1 | * | 3/2003 | Knudson et al. ................ 725/39 |
| 6,950,124 B2 | * | 9/2005 | Corl et al. ...................... 348/180 |
| 7,337,462 B2 | * | 2/2008 | Dudkiewicz et al. ......... 725/136 |
| 7,367,043 B2 | * | 4/2008 | Dudkiewicz et al. ......... 725/138 |
| 2005/0160457 A1 | * | 7/2005 | Rui et al. ........................ 725/45 |

FOREIGN PATENT DOCUMENTS

| | | |
|---|---|---|
| GB | 2 359 918 | 9/2001 |
| WO | WO 98/28916 | 7/1998 |
| WO | WO 00/01149 | 1/2000 |

(Continued)

OTHER PUBLICATIONS

Title: Prism: Publishing Requirements for Industry Standards Metadata—Version 1.0 Date: Apr. 9, 2001 Company/Organization: PRISM Working Group.

(Continued)

*Primary Examiner* — Annan Q Shang
(74) *Attorney, Agent, or Firm* — Rory D. Rankin; Meyertons, Hood, Kivlin, Kowert & Goetzel, P.C.

(57) ABSTRACT

A method and mechanism for delivering and processing relational metadata in a television system. A client is configured to receive a broadcast signal and relational metadata which corresponds to received programming. The received relational metadata includes information which identifies two sets of data and a relationship between them. Upon identifying the data indicated by the relational metadata and determining the indicated relationship, the client is configured to perform a predetermined action which corresponds to the received relational metadata and the identified data sets. The receiver includes, or is coupled to, a mass storage device configured to store received relational metadata and programming. Among the actions which may be automatically performed include replacing the first identified data with the second data on the storage device, deleting the first or second data from the storage device, requesting the second data from a remote location, or copying a previously captured portion of a broadcast signal from a temporary buffer to a mass storage device. Further, utilizing the relational metadata, personalized viewing content and experiences may be created by a viewer.

40 Claims, 13 Drawing Sheets

FOREIGN PATENT DOCUMENTS

| WO | WO 00/43899 | 7/2000 |
|---|---|---|
| WO | WO 01/72042 | 9/2001 |

OTHER PUBLICATIONS

Title: Requirements Series: R-3 On: Metadata Requirements (Normative)—Document TV037r2 Date: Apr. 7, 2000 Company/Organization: The TV-Anytime Forum (www.tv-anytime.org).

Title: Overview of the MPEG-7 Standard (version 5.0)—Document ISO/IEC JTC1/SC29/WG11 N4031 Location & Date: Singapore, Mar. 2001 Company/Organization: International Organisation for Standardisation.

United States Patent Application Publication; Jain, et al.; Pub. No. US 2001/0018693; Pub. Date: Aug. 30, 2001; Video Cataloger System with Synchronized Encoders.

International Search Report; Application No. PCT/US 02/32151; International Filing Date: Oct. 9, 2002.

European Examination Report for Application No. 02 780 432.7-2223 mailed Oct. 26, 2009.

* cited by examiner

|  | 7:00 - 7:30 | 7:30 - 8:00 | 8:00 - 8:30 | 8:30 - 9:00 | 9:00 - 9:30 |
|---|---|---|---|---|---|
| NBC | Weakest Tie | | Movie of the Week - "The Judge" | | |
| ABC | Air Force One (Repeat) (R) | | | | News |
| CBS | Queen of Kings | No, Dear | Some People Like Raymond | Magician's Best Secrets Not Revealed | |
| FOX | Boston Private | | Ally McDeal's Big Adventure | | News |
| ALL NEWS | Local News | | World News | | Local News |

Time 8:24am          Date Monday, July 29, 2001

Selection:    Title:    Local News
                Channel:    ALL NEWS

Options:    Yes   No

1170A → ☒ ☐ Record    Date: July 30, 2001 Time: 8:30pm - 9:30pm

1170B → ☒ ☐ Summary Also

1170C → ☐ ☒ Summary Only

1170D → ☒ ☐ Corrections    How Long: 12 hours

1170E → ☐ ☒ More Details

1170F → ☒ ☐ Ignore Repeat

Time 8:24am        Date Monday, July 29, 2001

Selection:  Title:     Eagles vs. Bears
1182            Channel:   Alpha Sports
                Type:      Sports - American Football/Professional

Options:
            Yes   No

1184A →    [X]   [ ]   Record     Date: July 30, 2001 Time: 8:30pm - 11:30pm

1184B →    [X]   [ ]   Entire Game

1184C →    [X]   [ ]   Summary

1184D →    [X]   [ ]   Scoring Events

1184E →    [ ]   [X]   Penalties and nullified plays.

1184F →    [ ]   [X]   Halftime Entertainment

1184G →    [X]   [ ]   Interceptions

1184H →    [ ]   [X]   Replays

1184I →    [ ]   [X]   Keep entire game + all options

1184J →    [X]   [ ]   Do not keep entire game - trim down to options

1186

Current Selection: Record the Eagles vs. Bears game, including any summaries, scoring events, and interceptions. Do not record penalties and nullified plays, halftime entertainment, or replays. Then trim down to just the summary, scoring events, and interceptions.

1188

1190 — Space Available: 480m/240m/120m

1192 — Current Selection Predicted Usage: 224m complete/13m trimmed

Other Options

*FIG. 11C*

|  | 1210 |  | 1200 |  |  |
|---|---|---|---|---|---|
| PC! | 7:00 - 7:30 | 7:30 - 8:00 | 8:00 - 8:30 | 8:30 - 9:00 | 9:00 - 9:30 |
| NBC | Millionaire | | Movie of the Week - "Son of The Judge" | | |
| (X) ABC | ←1215 Air Force Two | | | | News |
| CBS | Queen of Kings | No, Dear | Some People Like Raymond | Funniest Animals | |
| FOX | LAPD Green | | Sanford and Daughter | | News |
| ALL NEWS [PC!] | Local News | | World News | | Local News |

Available Personalized Content

Selection: Title: Local News
Channel: ALL NEWS

Recorded: Date: July 30, 2001 Time: 8:30pm - 9:30pm             1290

| 1260 → View | View Summary Only ←1270 | Title ←1280 | Delete After View | Now |
|---|---|---|---|---|
| 1262A — [2] | [ ] | 3 Alarm Fire injures two. | [X] | [ ] |
| 1262B — [ ] | [ ] | City council postpones vote on light rail | [ ] | [X] |
| 1262C — [1] | [ ] | Semiconductor fab begins construction | [X] | [ ] |
| 1262D — [ ] | [3] | Local unemployment drops to 1.8% | [X] | [ ] |

| Play Selected | Play All | Play All Summaries | RETURN to Program Guide | Main Menu |
|---|---|---|---|---|
| 1292A | 1292B | 1292C | 1292D | 1292E |

*FIG. 12B*

UTILIZATION OF RELATIONAL METADATA IN A TELEVISION SYSTEM

BACKGROUND OF THE INVENTION

1. Field of the Invention

The present invention relates generally to television broadcast systems and, more particularly, to the transmission and use of relational metadata.

2. Description of Related Art

Television service providers, such as a satellite broadcaster or a cable multiple system operator (MSO), transmit audio-video streams to a viewer's television system. The viewer's television system frequently consists of a set-top box connected to a television set and a recording device, but may consist of any number of suitable devices. In addition to the audio and video that viewers typically think of as television programs, television service providers may transmit additional information as well. For example, the additional information may be instructions which are interpreted by an interpreter or virtual machine. Alternatively, a service provider may transmit HTML data for rendering by a presentation engine. If the broadcast is analog, this additional information may be encoded in the VBI (vertical blanking interval). If the broadcast is digital, additional information may be multiplexed with the audio and video according to a standard format, such as MPEG-2, or a proprietary format.

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information. Both the interactive content and the audio and video data may be delivered to subscribers as "pushed" data. That is, the data is delivered to each of the subscribers, regardless of whether or not the subscribers requested the data.

The interactive functionality of the television is generally controlled by a client, such as an Integrated Receiver Decoder (IRD), which may, for example, be embodied in a television, set-top box, or other device connected to the television. The client receives the signal transmitted by a broadcast service provider or system operator, separates the interactive portion from the audio-video portion and decompresses the respective portions of the signal. The client uses the interactive information to, for example, execute an application while the audio-video information is transmitted to the television. The client may combine the audio-video information with interactive graphics or audio generated by the interactive application prior to transmitting the information to the television. The interactive graphics and audio may present additional information to the viewer or may prompt the viewer for input. The client may provide viewer input or other information to the broadcast service provider or system operator via a return path.

Interactive content such as application code or information relating to television programs is sometimes broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what can be referred to as a "carousel." Frequently, a single carousel is transported as a contiguous data stream. However, it is also possible to multiplex two or more carousels in a single data stream. Instead of using a carousel format, some interactive television systems may be configured to more heavily use a return path, requiring the client to request much of the interactive content via the return path.

Broadcast systems (e.g., interactive television systems) transmit information in a carousel format in order to allow clients in the system to selectively obtain particular pieces of information in the carousel without requiring a return path from the clients to the server. If a particular client needs a particular piece of information, it can simply wait until the next time that piece of information is broadcast, and then extract the information from the broadcast data stream. Other clients in the system can operate in the same manner, each client waiting for the information it needs, and then using only that information. By employing carousels to broadcast information, the system eliminates the need to connect each of the clients with the server and further eliminates the need for the server to process individual requests for information, while still allowing different viewers to join at different times. Generally, a broadcast signal may include a number of programs which in turn may include a number of audio/video streams and/or data streams. Data streams may be used to carry data such as interactive application data, subtitle information, or other data.

The pieces of information, or data objects, in a carousel may be intended to be combined to comprise a program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. (It should be noted that many types of programs are possible, and it is not necessary to include either audio, video or interactive content with any particular program. A program might contain only audio and interactive data (e.g., an interactive radio program,) or it might contain only interactive data (e.g., an interactive weather program that does not contain audio or video streams.) Typically, each program is associated with a corresponding channel and, when a channel containing a particular program is selected by the interactive television client, the data which is being broadcast on that channel is downloaded and the program is started.

In addition to video, audio, and other data, information known as metadata may be included in a broadcast. Generally speaking, metadata is data, or information, about other data. For example, information in a broadcast stream for an electronic program guide may be considered metadata because it contains information about corresponding audio and video. Other examples of metadata may include information indicating, for example, which languages are available for a particular program, the genre of a movie, the names of actors, and automatically computed data such as the distribution of color in the various scenes. However, all these types of metadata provide only limited information and/or functionality.

What is desired is a method and mechanism for generating and utilizing metadata to enhance the viewing experience.

SUMMARY OF THE INVENTION

The problems outlined above may be solved by various embodiments of the invention described herein.

In one embodiment, a method is contemplated which includes receiving relational metadata which corresponds to a broadcast signal. The received relational metadata includes information which identifies a first and a second data. Such data may include video content, audio content, or other data. Subsequent to receiving the relational metadata, each of the first and second data may be identified. Further, a relationship between the first and second data are determined. Upon determining this relationship, an action may be automatically performed. In various embodiments, this automatically performed action may include replacing the first identified data with the second data on a storage device, deleting the first or second data from a storage device, or some other action. Further, in one embodiment, the received relational metadata may identify a first data which was previously broadcast. The second data which is identified by the relational metadata may precede or follow the relational metadata, or may be included in a signal broadcast concurrently with the relational metadata. Additionally, the relational metadata may include a reference to the second data which is then requested and subsequently received. In alternative embodiments, the second data may contain the first data or vice-versa.

Also contemplated is a device for processing relational metadata. In one embodiment, the device includes a client which is configured to receive a broadcast signal. Coupled to the client is a relational metadata processing engine. Generally speaking, the processing engine is configured to detect relational metadata which identifies a particular relationship between two sets of data. Subsequent to determining the data identified, and the relationship which is indicated, the processing engine is configured to automatically take a predetermined action. In one embodiment, the processing engine may be configured by a viewer to take a specified action when a particular data and corresponding relational metadata are detected. Further, the device may include, or be coupled to, a mass storage device which is capable of storing both relational metadata and the data which is identified by relational metadata.

Also contemplated is a relational metadata processing engine which includes a parsing unit, an association unit, a decision unit, and one or more action units. Generally speaking, the parsing unit is configured to parse received data and identify relational metadata instructions which are included therein. The association unit is configured to identify particular sets of data which are indicated by the relational metadata instruction. In addition, the association unit may be configured to identify a relationship between two or more of the sets of data, which is indicated by the instruction. The decision unit is configured to receive information from the association unit regarding the identified data and relationship, and is configured to responsively initiate a particular action. In one embodiment, the decision unit conveys an indication to an action unit which then performs the indicated action. In one embodiment, the action need not be taken immediately, but may be scheduled to take place at a later time. Numerous alternatives are possible for determining what actions are to be taken and how they are to be taken. For example, actions may be taken according to a predetermined configuration, responsive to user input, or otherwise.

Still further, a system is contemplated which includes a first source and a second source. The first source is configured to convey a broadcast signal which includes a plurality of programming signals, which may be sent concurrently or sequentially. The second source is configured to inject relational metadata into the broadcast signal. The injected relational metadata identifies a relationship between a first data of said plurality of programming signals and a second data. Further, relational metadata is configured to be processed and used to indicate an action corresponding to the first data.

Other embodiments and variations of the above embodiments are contemplated as well, as described in the following.

BRIEF DESCRIPTION OF THE DRAWINGS

Other objects and advantages of the invention will become apparent upon reading the following detailed description and upon reference to the accompanying drawings in which:

FIG. 11A illustrates one embodiment of a display useful in describing the actions of the relational metadata processing engine's actions in FIG. 11B and FIG. 11C.

FIG. 11B illustrates one embodiment of an interface for configuring a relational metadata processing engine.

FIG. 11C illustrates one embodiment of an interface for configuring a relational metadata processing engine.

FIG. 12A illustrates one embodiment of a display indicating personalized content that is used in describing the use of the relative metadata by the viewer.

FIG. 12B illustrates one embodiment of an interface for presenting personalized content.

Figure 1:
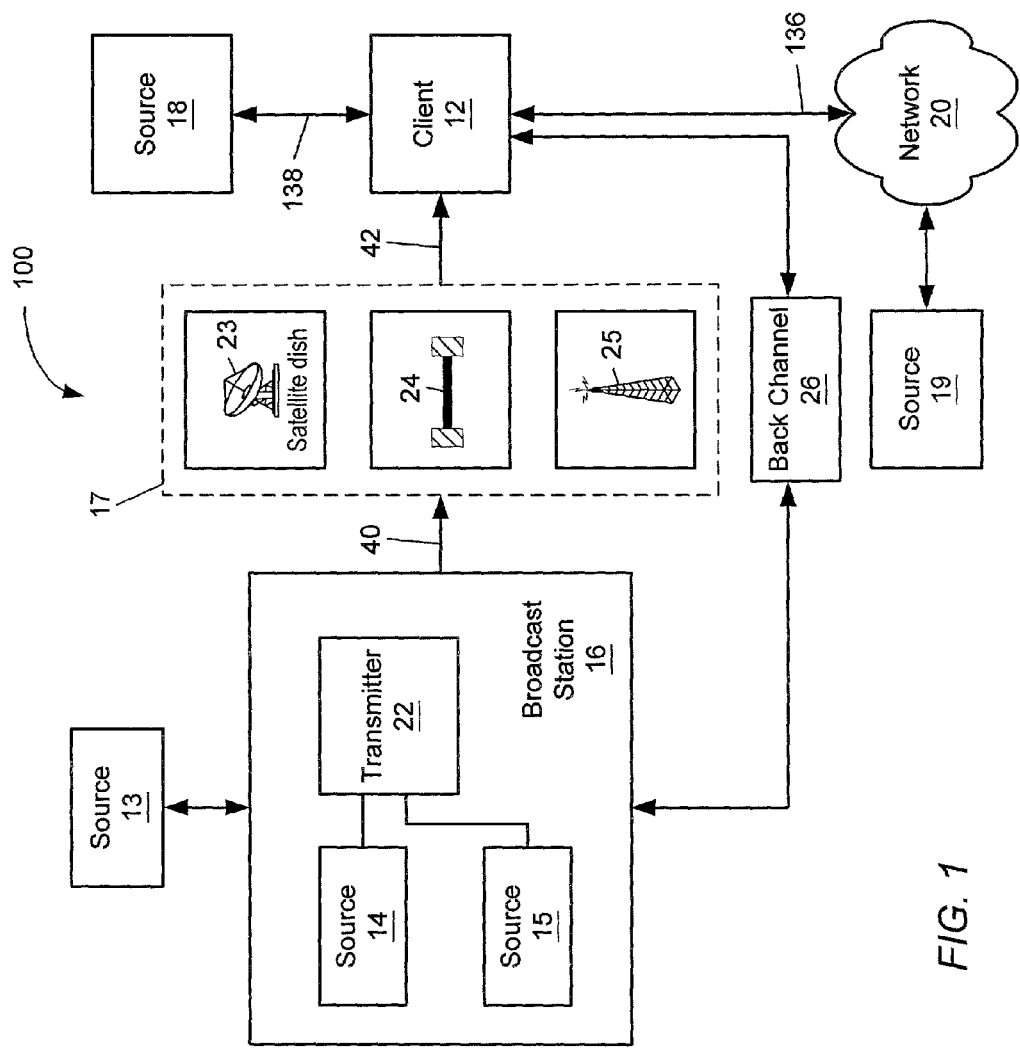
FIG. 1 is a diagram of one embodiment of a broadcast television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

Referring to FIG. 1, one embodiment of a television system 100 is shown. In the embodiment shown, a receiving device 12 is coupled to several sources of programming and/or interactive content. Receiving device 12 may include any number of suitable devices, examples of such devices include a set-top box (STB), a television (TV), a video cassette recorder (VCR), a personal video recorder (PVR), a personal digital assistant (PDA), a personal computer (PC), a video game console, or a mobile/cell phone.

Included in the embodiment of FIG. 1, a broadcast station 16 is coupled to a client 12 via a transmission medium 17 and back channel 26. In addition, client 12 is coupled to a source 18 and source 19 via network 20. Further, broadcast station 16 is coupled to a remote source 13. In the embodiment shown, broadcast station 16 includes sources 14 and 15 and transmitter 22. Transmission medium 17 may comprise a satellite based system 23, a cable based system 24, a terrestrial or multiple multi-point distribution service (MMDS) based system 25, a combination of these systems, or some other appropriate system of transmission.

In the embodiment of FIG. 1, broadcast station 16 may include a variety of sources 14 and 15 of content to be utilized and conveyed by transmitter 22. Content sources 14 and 15 may include databases, application servers, other audio/video sources, or other data sources. In one embodiment, content may be created at a source 14 which may include an authoring station configured to create such content. An authoring station may include a computer workstation configured with software which aids in the development of interactive content. An authoring station may be part of broadcast station 16 in which case the conveyance of the created content may be through a local computing network, or similar configuration. Alternatively, an authoring station may be remotely located 13 from broadcast station 16. In an embodiment where authoring station is not directly coupled to broadcast station 16, the content created by a source 13 may be conveyed to broadcast station 16 via Internet, broadcast, cable, etc. In some cases, content created at a remote location 13 may first be transferred to a storage medium, such as a CD-ROM or DVD-ROM, and transported to broadcast station 16 via more conventional means where it may be stored in a database or other storage device.

Subsequent to its creation, content from sources 13, 14 and 15 may be delivered to client 12 through a broadcast transmission network. This network consists essentially of a broadcast station 16 which assembles the content from sources 13, 14 and 15 and processes (e.g., digitizes, compresses and packetizes) the content, and a transmission network 17 which receives the content 40 from broadcast station 16 and conveys it 42 to client 12. (It should be noted that client 12 may be only one of many devices to which this content is distributed.) In one embodiment, broadcast station 16 includes software and/or hardware which is configured to process the content conveyed by sources 13, 14 and 15 as described above. A second delivery mechanism may include a direct point-to-point connection 138 between client 12 and source 18 which may be some type of server. This connection 138 may be made via an ordinary telephone line, cable, wireless, or otherwise. A third delivery mechanism may also be a point-to-point connection 136, but transmission of the content from a source 19 to client 12 is made via one or more shared networks (e.g., over the Internet). Also illustrated in FIG. 1 is a back channel (or return path) 26 by which client 12 may convey to and/or receive data from broadcast station 16. Back channel 26 may comprise a telephone line, cable, wireless, or other connection.

One delivery mechanism, the direct point-to-point connection to a source of content, may comprise communication via an ordinary telephone line. This type of connection is typically initiated by the client to convey information to, or retrieve information from, a data server. Another delivery mechanism, the point-to-point connection through one or more networks, may comprise a typical connection between nodes on the Internet. Because data may be routed through many different shared networks in this case, it may be read, stored and written many times as it is transmitted from source 19 to client 12. The third delivery mechanism may include a satellite, cable or terrestrial broadcast network.

In one embodiment, in addition to audio and video, broadcast station 16 is also configured to convey "relational" metadata to client 12. Relational metadata may also be conveyed to client 12 from alternate sources such as source 18, source 19, or via back channel 26. In one embodiment, relational metadata is metadata which indicates a relationship between two or more sets of data. For example, relational metadata may indicate that a particular portion of a broadcast corresponds to a highlight when compared with the other portions of the same broadcast. Relational metadata may indicate that one portion of a broadcast corrects another portion. Relational metadata may indicate the relative importance of a particular portion of a broadcast. Further, relational metadata may indicate that there are a greater number of or fewer number of details in one portion of a broadcast than in another portion. Many other such relationships are possible and are contemplated. Subsequent to receiving the conveyed relational metadata, client 12 may perform a corresponding action. For example, if received relational metadata indicates one portion of a broadcast is a correction of a previous portion of a broadcast, client 12 may be configured to automatically record the corrected version and delete the version that contained the error. Further, relational metadata may be utilized to create viewing experiences which are personalized according to the desires of a viewer. Relational metadata is discussed further below.

Figure 2:
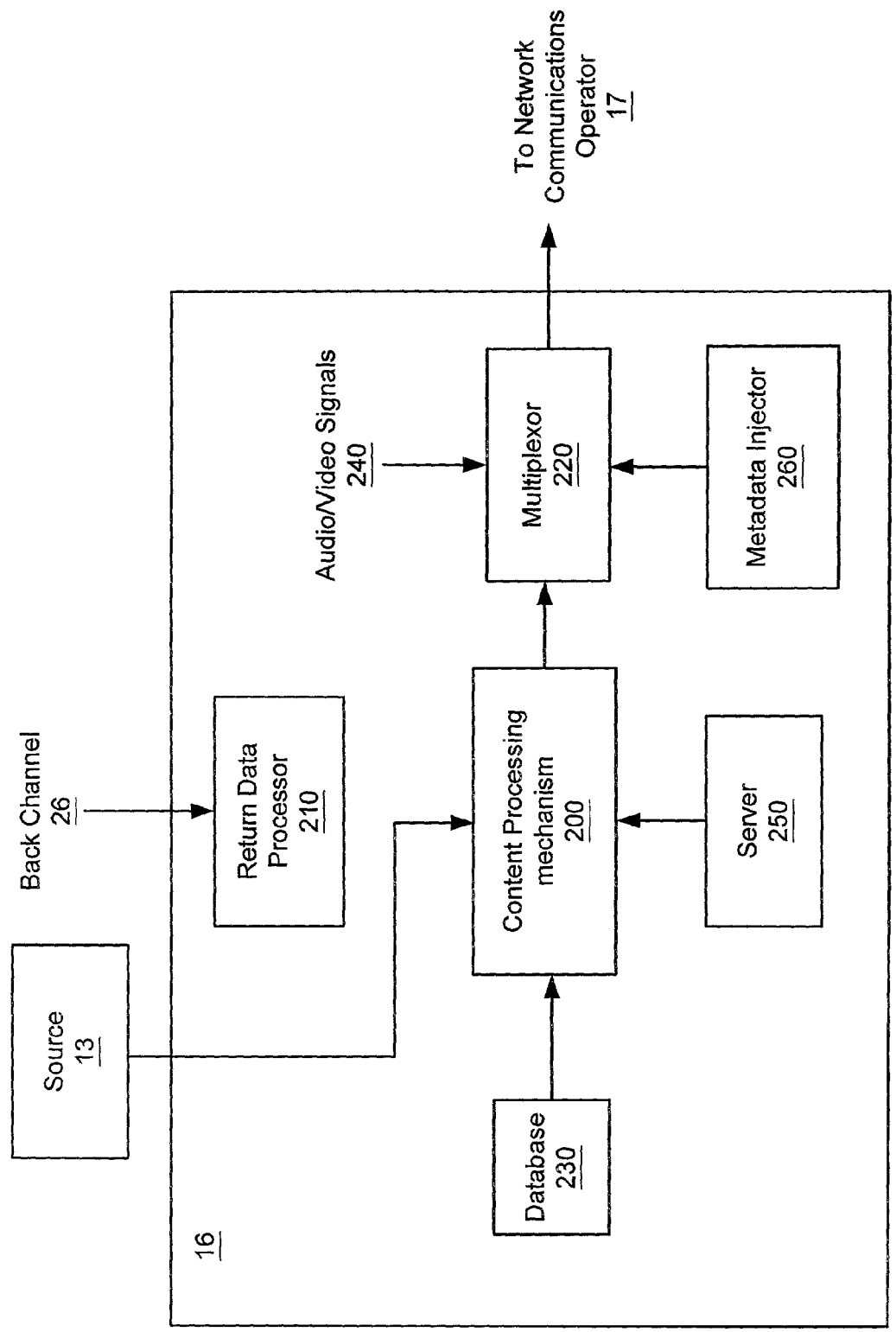
FIG. 2 is a diagram of one embodiment of a headend.

Turning now to FIG. 2, an overview of one embodiment of a broadcast station (head-end) 16 is shown. The broadcast station 16 of FIG. 2, includes an application server 250 and a database 230 which contains previously created interactive content. Also shown in FIG. 2 is a source 13 of content which is external to broadcast station 16 and coupled to broadcast station 16. Database 230, server 250, and source 13 are coupled to a content processing mechanism 200 which is configured to process the content received and convey the processed content to a multiplexor 220. Also coupled to multiplexor 220 is a source 240 of audio/video signals and a relational metadata injector 260. Relational metadata injector 260 is configured to insert relational metadata into a broadcast stream. In an alternative embodiment, relational metadata may be conveyed from an alternate source, such as server 250, database 230, or signals 240.

In one embodiment, content processing mechanism 200 may comprise a computer and may also be coupled to receive and convey content from the Internet or World Wide Web. Processing mechanism 200 is configured to convey the processed content to multiplexor 220. Multiplexor 220 is also coupled to receive audio/video signals 240 and relational metadata 260. Multiplexor 220 multiplexes the received signals and conveys the multiplexed signal to network communications operator 17 where it is subsequently conveyed to a receiving device. Finally, broadcast station 16 includes a return data processor 210 coupled to back channel 26. In one embodiment, return data processor 210 may comprise a modem which receives data for further processing within broadcast station 16. While the above description describes a source of interactive content as being at a broadcast station 16, this need not be the case. In an alternative embodiment, database 230, metadata injector 260, and content processing mechanism 200 may reside elsewhere, such as at the location of a network communications operator 17, or otherwise. An example of such an alternative embodiment may be a cable station which inserts interactive content into a broadcast signal prior to transmission.

Relational Metadata

As previously mentioned, relational metadata may be included in a broadcast stream. In one embodiment, relational metadata describes relationships between two or more sets of data. For example, relational metadata may be used to indicate that one portion of a programming signal corrects another portion. Such a case may occur, for example, when a first news broadcast provides some early, but incorrect, information on a breaking news story. Further, relational metadata may identify the beginning and end of a selected portion of a programming stream. For example, relational metadata may be used to identify individual news stories in a news broadcast, or individual scenes in a movie. As another example, relational metadata may indicate that a particular portion of a broadcast corresponds to a highlight when compared with other portions of the same broadcast. Further, relational metadata may indicate that a particular broadcast contains more, or less, detail than another portion. Still further, relational metadata may indicate the relative importance of a portion of the broadcast.

Generally speaking, relational metadata may be transmitted after the transmission of at least one of the portions of a television broadcast to which it corresponds. This metadata can be used by a client in recording or viewing information from a live broadcast or when viewing a previously recorded presentation portion. For example, a client may be configured to utilize relational metadata to take some particular action, such as replacing a previously recorded broadcast with a later corrected broadcast, or permanently storing on a mass storage device a previously received portion of a broadcast signal that was temporarily stored in a buffer. This relational metadata can be used to identify highlights for a viewer, aid the viewer in choosing from among different versions of a recording, or to automatically determine how the limited available media space should be allocated among various possible recordings.

Relational Metadata Grammar

Figure 3A:
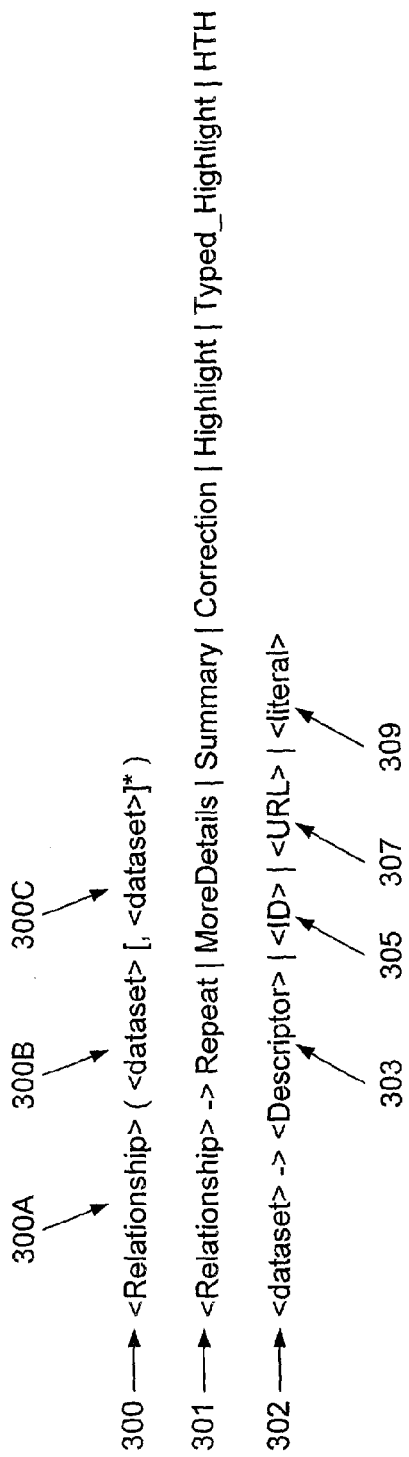
FIG. 3A illustrates one embodiment of a relational metadata grammar.

FIG. 3A illustrates one embodiment of a portion of a grammar which may be used to describe a syntax for relational metadata. In the example shown, a top-rule 300 includes a Relationship element 300A, and data set elements 300B, 300C. The asterisk following data set element 300C indicates that zero or more of the element 300C may be present. In the embodiment shown, rule 301 illustrates that Relationship element 300A may comprise one of "Repeat", "MoreDetails", "Summary", "Correction", "Highlight", "Typed_Highlight", or "HTH". Rule 302 shows that data set element 300B and 300C may be selected from a Descriptor element 303, an ID element 305, Uniform Resource Locator (URL) element 307, or literal element 309. In one embodiment, a Descriptor element 303 includes an indication identifying a particular sub-stream (e.g., an MPEG-2 stream) and may also include information corresponding to that sub-stream. Such information may include identifiers, titles and other text, and so on. Alternatively, rather than the Descriptor including corresponding information, the Descriptor may include a pointer or other reference to information, such as a URL. In addition to a Descriptor 303, the data set element may comprise an ID element 305, URL element 307, or a literal element 309. A literal element 309 may itself comprise information, rather than referencing other data. References or pointers to data may refer to data which is included in a broadcast stream, data which is accessed via Internet, data which is requested from a server via a return path, or otherwise. For example, in response to detecting a data set reference 300B, a request may be conveyed to a remote server for conveyance of the corresponding data. It is to be understood that the embodiment of FIG. 3A is exemplary only. Numerous alternatives are possible and are contemplated.

Figure 3B:
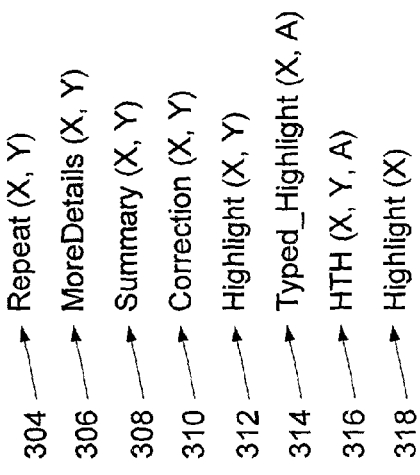
FIG. 3B illustrates one embodiment of relational metadata instructions.

Turning now to FIG. 3B, some examples of relational metadata instructions are shown. Such instructions may be created by a service provider, or other entity, to express the relationship between different data sets. The first statement 304 in FIG. 3B illustrates a "Repeat" instruction which may be used to indicate that one portion of a broadcast, represented by Y is a re-broadcast of another portion of a broadcast X. For example, the second portion Y may be a re-broadcast of an earlier received news story. The second statement 306 illustrates a "MoreDetails" instruction which may be used to indicate that one portion of a broadcast Y is related to another portion of a broadcast X, but contains more detail than the portion X. For example, the second portion Y could be a news broadcast with more detail, a sporting event with more camera angles available, or an uncut version of a movie. The third example shown 308 is an example of a "Summary" instruction which may be used to indicate that the portion of the broadcast represented by Y is a summary of the portion represented by X. For example, Y may correspond to a reporter's commentary on a basketball game or a summary of a previously broadcast news story.

Illustrated by the fourth example 310 is a "Correction" instruction which indicates that the portion of the broadcast represented by Y includes a correction of an earlier broadcast represented by X. Such corrections may be used, for example, to correct the score of a ball game, the daily high temperature, or the name of a lost hiker reported in a news story. The fifth example 312 shows a "Highlight" instruction which may indicate that the portion of the broadcast represented by Y is a highlight of the event indicated by X. For example, all of the exciting plays of a ballgame may be marked as a highlight. What is considered a highlight may of course be determined in any suitable manner, such as by a representative of the provider. Alternatively, viewers may be able to vote on which plays of a sporting event they most liked (e.g., via interactive television, Internet, or otherwise), or what scenes of a soap opera they would most like to see again, to determine what is considered a highlight.

The sixth example 314 is slightly different. The "Typed_Highlight" instruction 314 may be used to associate a portion of the broadcast, represented by X, with either a textual description or a graphical icon, indicating details about a highlight. As used herein, "icon" may refer to text, a graphic, an audio clip, or any other suitable audio and/or visual presentation. Visual icons may be presented on a display, while audio icons may be played via a coupled speaker. For example, one portion X of a ballgame may be associated with a textual description represented by A, where A is the literal text "Balk". Alternatively, A may be a locator for an icon representing a triple play or home run. The "HTH" 316 instruction illustrates an instruction with more than two data set elements. Instruction HTH 316 may be used in lieu of instructions 312 and 314. For example, HTH instruction 316 may indicate that a portion Y is a highlight of a portion X. Further, HTH instruction 316 may include text or an icon A which corresponds to the highlight Y. Finally, instruction 318 illustrates a Highlight instruction including only a single data element. In the example shown, instruction 318 may indicate X is a highlight of some event. In one embodiment, the event which X is a highlight of need not be indicated. For example, the highlight X may simply be described as a baseball highlight. Alternatively, by default, the event currently being watched by the viewer may be the implied event. The examples illustrated by FIG. 3B and the example values for <Relationship> and <dataset> in FIG. 3A are not intended to be limiting, but are merely intended to illustrate some of the uses for relational metadata.

Figure 4A:
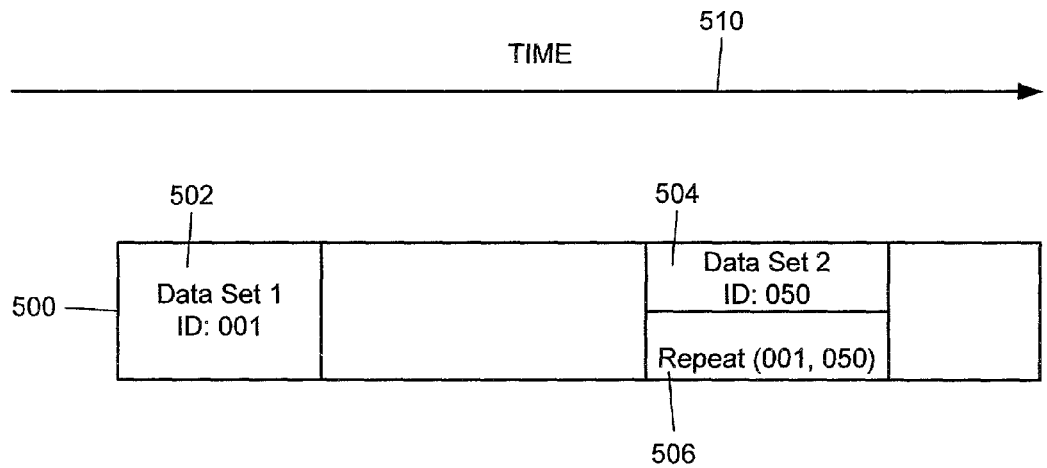
FIG. 4A illustrates an example of a signal including relational metadata.
Figure 4B:
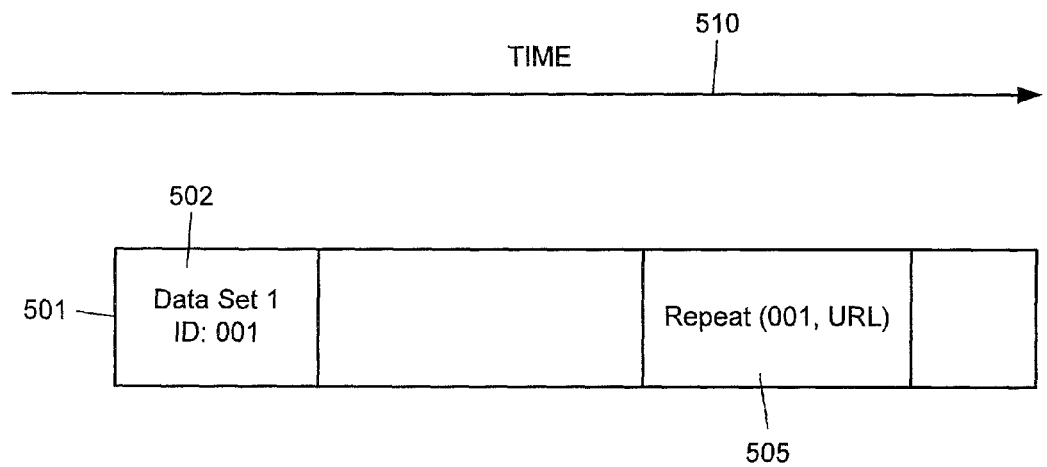
FIG. 4B illustrates an example of a signal including relational metadata which indicates a source of data.
Figure 5:
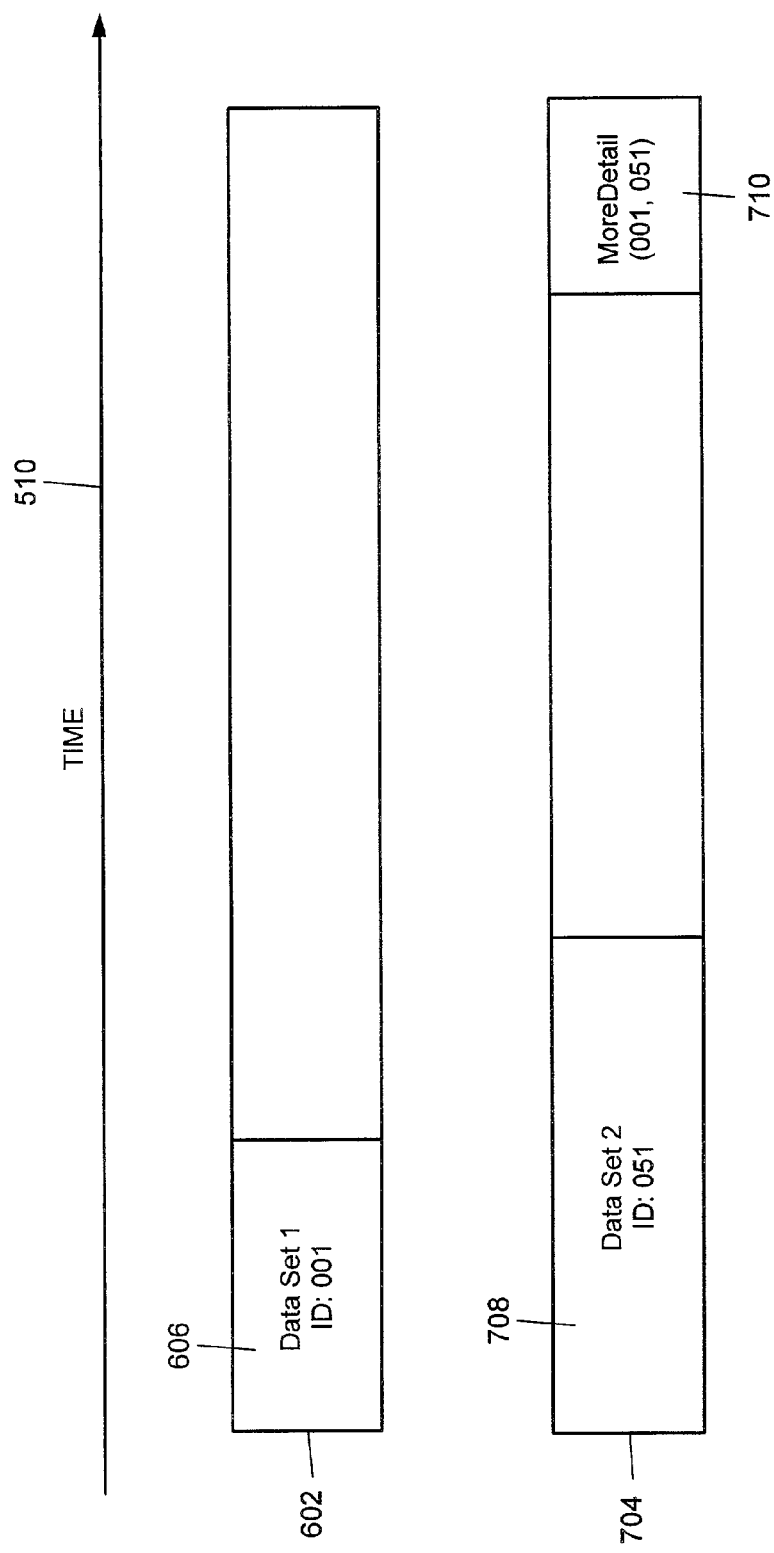
FIG. 5 illustrates an example of signals which include relational metadata.
Figure 6:
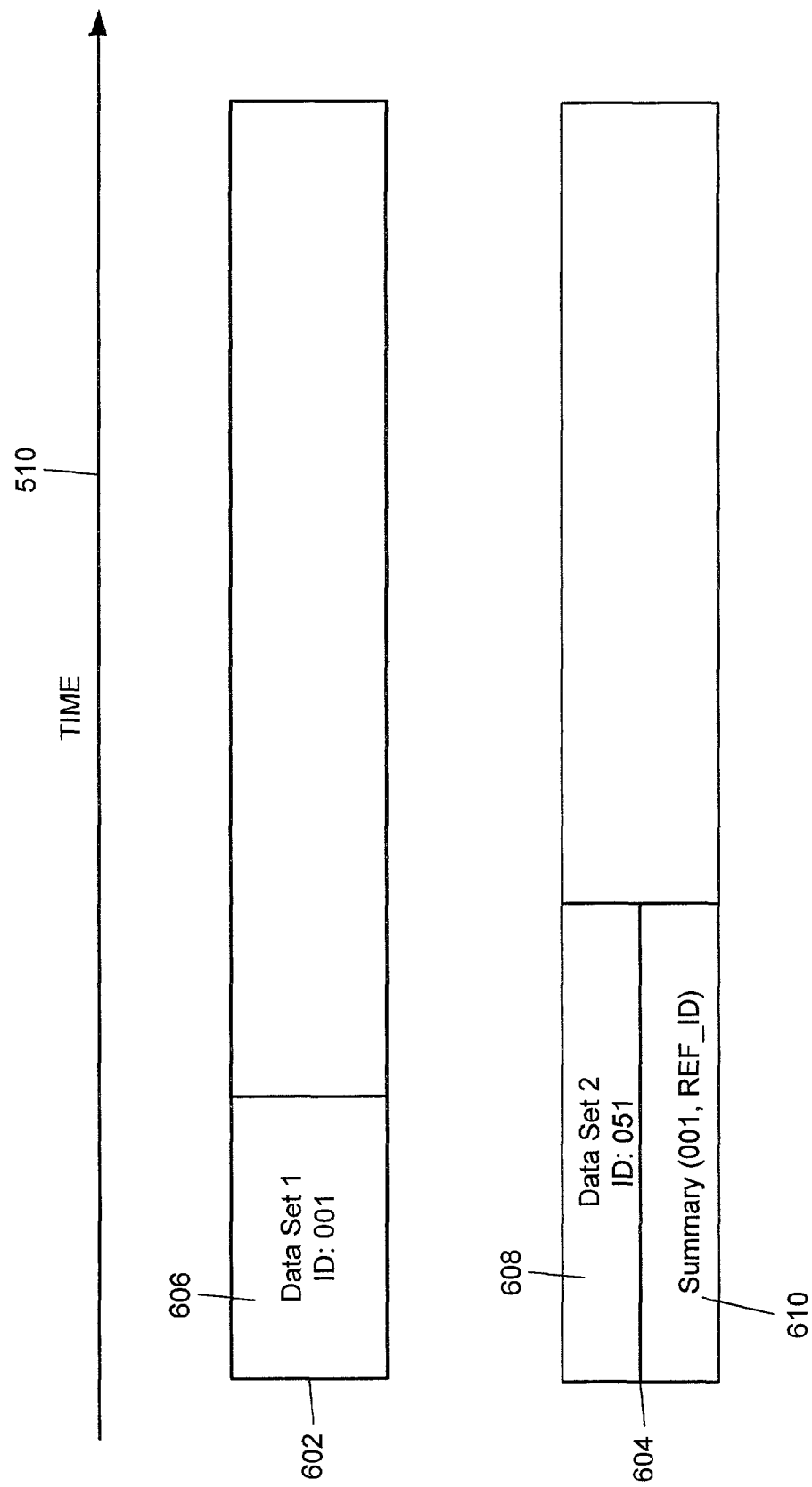
FIG. 6 illustrates an example of signals which include relational metadata.

FIGS. 4-6 present a variety of examples illustrating the use of relational metadata. FIG. 4A illustrates the use of a "Repeat" instruction to indicate the relationship between two data sets. Included in FIG. 4A is a timeline 510 indicating the passage of time from left to right. Events to the left, on the timeline 510, are seen to occur prior to events on the right. Also shown in FIG. 4A is a portion of a broadcast signal 500. Signal 500 includes data set 1 502, data set 2 504, and relational metadata 506. Data set 1 502 is conveyed prior to the conveyance of data set 2 504 and metadata 506. Data set 2 504 and instruction 506 are shown to be conveyed at approximately the same time, though 506 may also completely precede or completely follow data set 2 504. In the example shown, data set 1 502 may, for example, correspond to a news story. Data sets may comprise audio, video, teletext, or executable data, for example. Included in data set 1 502 is an identifier, ID: 001, which may be used to distinguish data set 1 502 from other data. Data set 2 504 also includes a corresponding identifier, ID: 050. In the example shown, a Repeat instruction 506 is included in signal 500. Repeat instruction 506 includes two identifiers, 050 and 001. Consequently, in the example shown, Repeat instruction 506 indicates that the data set corresponding to identifier 050 is a repeat of the data set corresponding to the identifier 001. Alternatively, instead of using identifiers such as 050 and 001, tuples such as start and stop times along with a transport stream identifier and optionally a frequency may be used to identify the respective data sets. Utilizing this information, a client may be configured to avoid recording data set 2 504 if data set 1 502 has already been recorded.

FIG. 4B illustrates an alternative use of "Repeat" relational metadata. FIG. 4B includes a programming signal 501 which includes data set 1 502. Also included in signal 501 is relational metadata 505 which includes an identifier 001 corresponding to data set 1 502. However, in contrast to the example of FIG. 4A, relational metadata 505 does not identify a second data set which is included in signal 501. Rather, relational metadata 505 includes a URL which refers to the second data set. This URL may then be utilized to request the corresponding data if desired.

FIG. 5 illustrates another example of how relational metadata may be used. Like FIGS. 4A-4B, FIG. 5 includes timeline 510. Also included in FIG. 5 are two programming signals, 602 and 704. Programming signal 602 includes a data set, data set 1 606. Programming signal 704 includes data set 2 708 and relational metadata 710. Data sets 606 and 708 are shown as including an overlap in time. Subsequent to the conveyance of data sets 606 and 708, the MoreDetail relational metadata instruction 710 is conveyed which indicates that the data set identified by ID: 051 is a more detailed version of the data set identified by the ID: 001. If a receiving device recorded both data set 1 606 and data set 2 708, relational metadata 710 may be used by the receiving device to permit the viewer to choose which version they wish to see or to, perhaps automatically, retain one version and delete the other. Alternatively, if only one data set was recorded, 606 or 708, metadata 710 may be used to identify the alternate data set on a re-broadcast. At that time, the receiving device may choose to replace the previously recorded version with the alternate version. Still further, if neither data set 1 606 nor data set 2 708 were previously recorded, relational metadata 710 may be used to request conveyance of the desired version. Advantageously, the desired version of a program or other data set may be retained and storage space not wasted on storage of undesired data. As an alternative, metadata 710 may be conveyed concurrently with data sets 606 and 708 and a receiving device may be configured to select the desired version for recording.

FIG. 6 shows another example wherein data is accessed via a reference. FIG. 6 includes timeline 510, programming signal 602, and programming signal 604. Included in data signal 604 is data set 608 and metadata 610. Metadata 610 in FIG. 6 is a "Summary" instruction. Included in Summary instruction 610 are a reference REF_ID, and a data set identifier, 001. The data set identifier included in the Summary instruction identifies data set 1 606. In addition, the Summary instruction 610 includes reference REF_ID which indicates a summary of data set 1 606 is available. REF_ID may be any type of indirect reference, including references which may be used to locate data on the mass storage of a receiving device. In response to detecting metadata 610, a receiving device may be configured to access and obtain the summary via the location indicated by REF_ID, and subsequently record the summary in lieu of the full data set 606. Alternatively, a receiving device may be configured to record data set 606 and obtain the summary indicated by the URL. In this manner, a viewer may subsequently view the summary and if desired, view the full version of the program or data which was recorded. Advantageously, a viewer may effectively create a number of summaries to "skim" through in order to identify those that are most interesting. A viewer may then immediately view the full version of the most interesting items.

Figure 7:
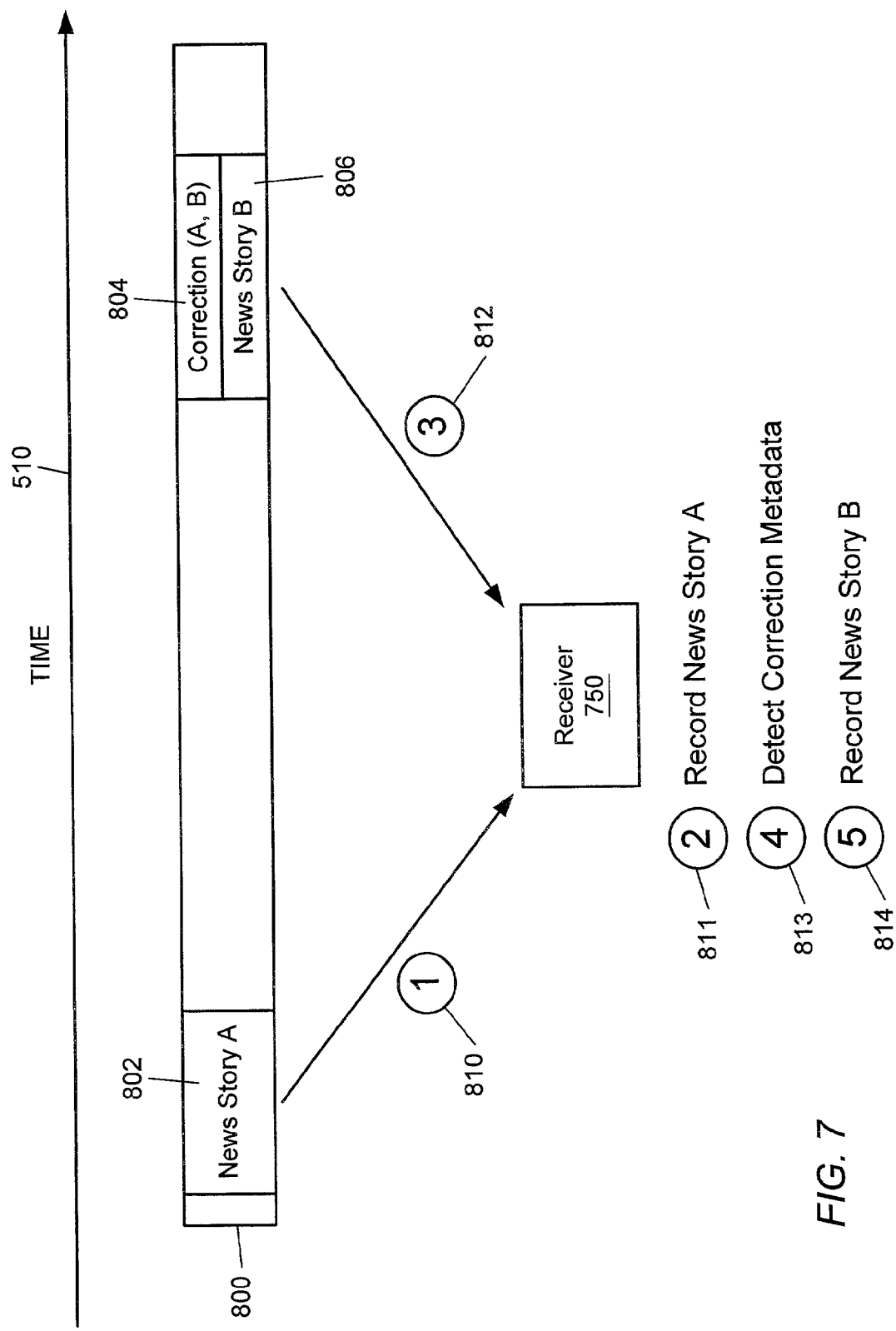
FIG. 7 illustrates one embodiment of a sequence of events related to relational metadata.

FIG. 7 illustrates a sequence of events illustrating an alternate view of the use of relational metadata. FIG. 7 includes timeline 510, a broadcast signal 800, and receiver 750. Receiver 750 is configured to detect and process metadata. Broadcast signal 800 includes a news story A 802, a news story B 806, and metadata 804. Also indicated by FIG. 7 is a sequence of events 1-5, labeled 810-814, respectively. At a first point in time 810 news story A 802 is received by receiver 750. At a second point in time 811, receiver 750 records the received news story A 802. Subsequently at time 812, receiver 750 receives news story B 806 and metadata 804. Receiver 750 then at time 813 detects the metadata 804 and identifies it as a Correction relational metadata instruction. Correction instruction 804 includes two identifiers, A which corresponds to news story A 802, and B which corresponds to news story B 806. Receiver 750 determines that Correction instruction 804 indicates news story B 806 is a correction of news story A 802. Receiver 750 further determines that news story A 802 was previously recorded. Subsequently at time 814, receiver 750 deletes the previously recorded news story A 802 and stores the corrected version, news story B 806. Advantageously, erroneous data may be automatically updated in a mass storage device which is included in, or coupled to, the client.

It is to be understood that the above illustrations are exemplary only and are not intended to be limiting. Those skilled in the art will recognize alternative embodiments are possible, and such embodiments are contemplated.

Figure 8:
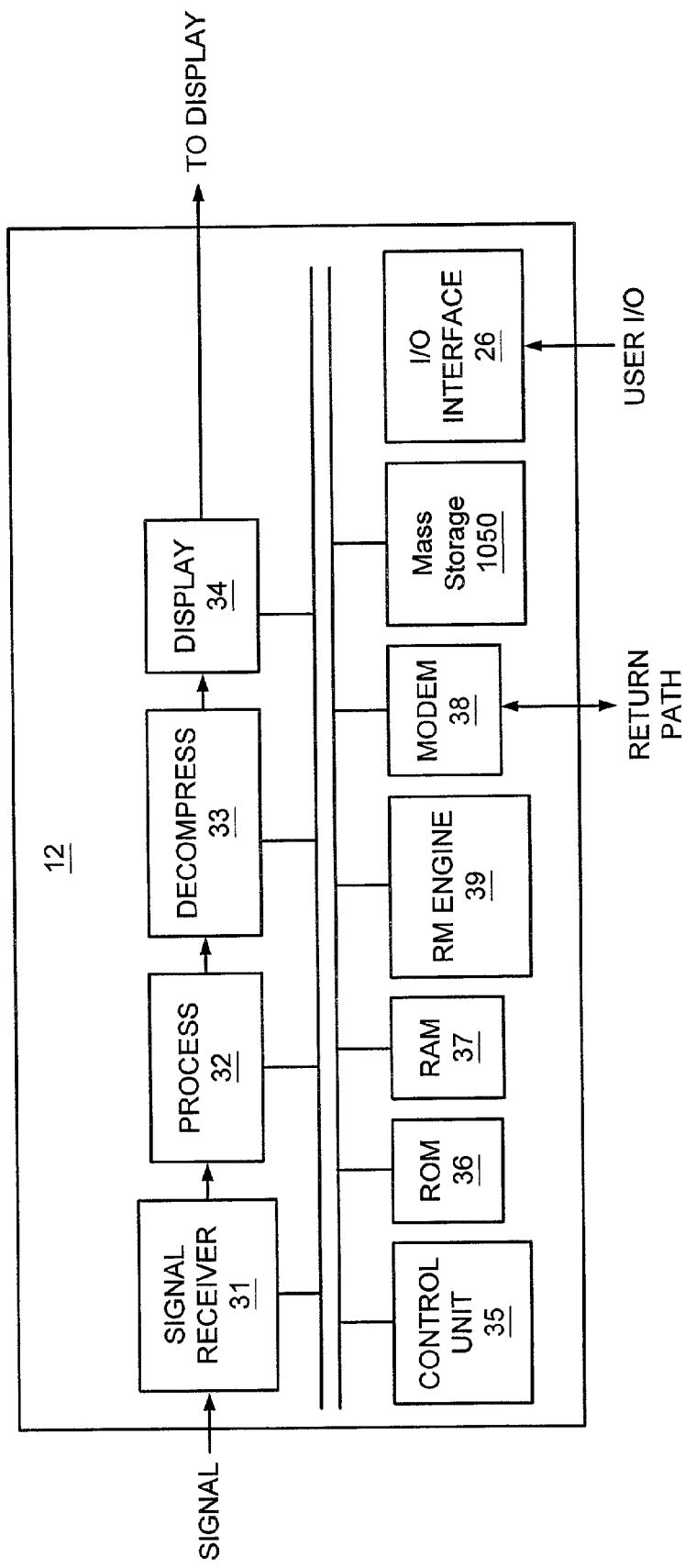
FIG. 8 is a block diagram of one embodiment of a client.

Turning now to FIG. 8, a block diagram of one embodiment of a client 12 configured to detect and process relational metadata is shown. As shown in FIG. 8, client 12 includes a signal receiving unit 31, process unit 32, decompress unit 33, display unit 34, control unit 35, ROM 36, RAM 37, MODEM 38, mass storage device 1050, and I/O interface unit 26. In addition, client 12 includes a relational metadata (RM) engine 39 which is configured to detect and process relational metadata.

In one embodiment, client 12 is implemented in a set-top box for a television. However, in other embodiments, client 12 may be incorporated into the circuitry of other components of a receiving station, such as a television, a video game console, a mobile/cell phone, or other device. In the embodiment shown, a broadcast signal is fed into signal receiver 31 which selects a channel on which broadcast content is transmitted and passes the content to processing unit 32. The received broadcast signal may include audio/video content, interactive television content, and/or relational metadata. (It should be noted that audio/video content, relational metadata and interactive television content may also be delivered to client 12 through other signal receivers, such as modem 38.) The broadcast signal may contain other information as well. For example, control signals or other data may be embedded in the broadcast signal. In the embodiment shown, client 12 includes a mass storage device 1050 within the client itself. Mass storage device 1050 may include a hard disk drive, CD, DVD, or any other suitable storage device. Alternative embodiments of client 12 may be coupled to an external mass storage device, rather than including mass storage within the client 12 itself.

In the case of a digital satellite transmission, content may be formatted into packets and multiplexed into a signal which is de-multiplexed and reconstructed by processing unit 32 into what is typically a compressed television program and/or interactive application embodied in the received content. Compressed content may then be decompressed by decompression unit 33. The audio and video information associated with the television program embodied in the signal is then conveyed to display unit 34, which may perform further processing and conversion of the information into a format which is suitable for display or recording, such as NTSC or HDTV audio/video. Applications reconstructed from the broadcast signal may be routed to random access memory (RAM) 37 and are executed by control unit 35. The user can interact with the applications or other interactive content through I/O devices which are coupled to client 12 via I/O interface 26. For example, a viewer may utilize an infrared remote control which is detected by interface unit 26. Alternatively, a viewer may utilize input devices such as a mouse, writing tablet, voice, or other device which is detected by interface unit 26. Many other possible viewer input devices are possible and are contemplated. (It should be noted that the foregoing description of the functionality of the interactive television system is only an example of such a system, and is not intended to be limiting.)

Control unit 35 may comprise a microprocessor, microcontroller, digital signal processor (DSP), or some other type of instruction processing device. Generally, operating system code executes continuously while the client 12 is powered, similar to the operating system code of a typical personal computer (PC), and enables the client to execute control information, application code, and embedded software.

In one embodiment, a viewer uses a remote control to provide input to client 12. I/O interface 26 detects input provided by a viewer. Input received from a viewer via I/O interface 26 may then be stored in a message queue for processing by control unit 35. For example, client 12 may execute an interactive application which is configured to process commands and other input by a viewer by accessing a particular address region in RAM 37. In such a configuration, a message queue for storing viewer input may be located at that particular address region. Alternatively, an interactive application may be configured to detect and receive input via the operating system code. Those skilled in the art will recognize that numerous alternative configurations for conveying viewer input to an interactive application are possible, and such alternatives are contemplated.

Generally speaking, applications executing within client 12 may be stored in memory 36 and/or 37. In one embodiment, RM engine 39 comprises application and/or system code which may be stored in memory 36 and/or 37. Alternatively, RM engine 39 may comprise circuitry, or a hardware/software combination which is configured to process relational metadata. In one embodiment, the functionality of RM engine 39 is configurable by a viewer. For example, a viewer may configure RM engine 39 to detect and record a particular program. Further, the viewer may configure the RM engine to continue to observe relational metadata which is received for a period of time after the particular program has completed recording. Relational metadata may be received via receiver 31, or via an alternate path such as via modem 38. If the RM engine detects a particular type of relational metadata corresponding to the recorded program during that specified period of time, the RM engine may be configured to take a predetermined action. For example, if the detected relational metadata indicates a corrected version of the recorded program is available, the RM engine may be configured to request conveyance of the corrected version, record the corrected version, and delete the original version. The corrected version could be received via signal receiver 31, modem 38, or some other suitable method.

Figure 9:
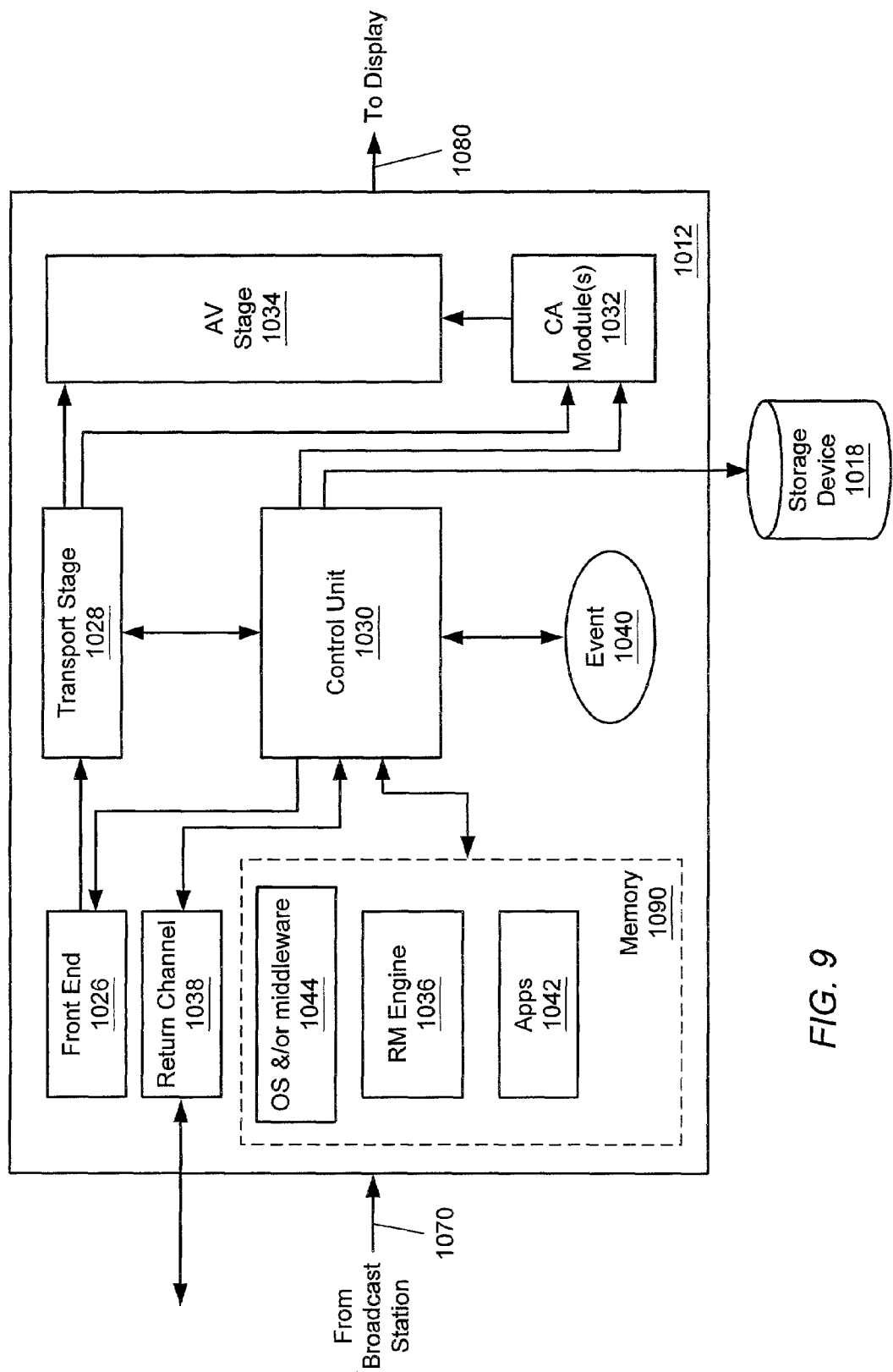
FIG. 9 is an alternative view of one embodiment of a client.

Turning now to FIG. 9, one embodiment of a client 1012 including an RM processing engine 1036 is shown. While FIG. 9 illustrates the client 1012 in the form of a set top box 1012, as mentioned above, client 1012 may be incorporated into any other suitable device. Generally speaking, client 1012 is configured to receive a first signal 1070, such as a broadcast signal, and convey a second signal 1080, such as to a display or recording device.

In the embodiment shown, set-top box 1012 is coupled to an external mass storage device 1018. Set-top box 1012 includes a control unit 1030, front end 1026, return channel 1038, transport stage 1028, and AV stage 1034. Also represented in FIG. 9 is a memory 1090 which includes OS and/or middleware 1044, RM engine 1036, and applications 1042. Also shown is an event 1040 and conditional access (CA) module(s) 1032. Event 1040 represents any event which may be detected by set-top box 1012. Such events 1040 may be caused by an external event, such as user interaction, or an internal event, such as software or hardware operation. Control unit 1030 may comprise a microprocessor, memory (e.g., RAM), and other components which are necessary to perform ordinary general purpose computing. In one embodiment, applications 1042, OS/middleware 1044, CA module(s) 1032, and RM engine 1036 comprise code which may be stored in a memory device of set-top box 1012. Additionally, CA module(s) 1032 may comprise system software configured to control access to particular programs or services which are accessible by set-top box 1012. While RM engine 1036 is shown as program code which may be stored in memory 1090 and executed by control unit 1030, it is understood that other embodiments are possible and are contemplated. For example, as previously mentioned, RM engine 1036 may comprise circuitry or a combination of hardware and software. Further, RM engine 1036 may be configured as an external device which may be coupled to a receiving unit. For example, such an external device may comprise an expansion module which is configured to add relational metadata functionality to a preexisting receiving unit.

Generally speaking, set top box 1012 is operable to receive and decompress signals which may include digital data. The decompressed signals may be converted into analog signals such as NTSC (National Television Standards Committee) format signals for television display, or may be in digital format for use by a digital television display. As shown in FIG. 9, set-top box 1012 includes front end circuitry 1026 operable to receive audio, video, and other data from a received signal 1070. The received signal 1070 is fed into the set top box 1012 at the front end 1026, which may comprise an analog to digital (A/D) converter and tuner/demodulators (not shown). Front end 1026 may select and pass a particular frequency, demodulate it, and convert it to a digital format. The digitized output may then be conveyed to a transport stage 1028 which further processes the data, conveying a portion of the data to an audio-visual (AV) stage 1034 for display and another portion to control processor 1030. In addition, CA module 1032 may receive data from transport stage 1028 and may conditionally convey a descrambled or other signal to AV stage 1034. Signaling and control information may also be included in the broadcast along with the audio-video data and may be manipulated by software within the set-top box 1012.

Audio-video signals and program control signals received by the set top box 1012 may include television programs, relational metadata, and menu selections accessible by a viewer through a user interface, as well as applications that may be executed. A viewer may control the set-top box 1012 in a variety of ways, including through an infrared remote control unit, a control panel on the set top box, or a device that is used to choose from a menu displayed on the television screen. Selections and entries made by the viewer may be intended for one or more of several applications that are executing on the set-top box. As mentioned above, broadcast signals 1070 are received via front end 1026 and are filtered by transport stage 1028. Unicast or multicast signals may generally be received via return channel 1038. Applications 1042 which execute on the set-top box 1012 may arrive there in a variety of ways. For example, applications may be received via a broadcast signal 1070, via the return channel resource interface 1038, or via storage device 1018. Applications received via storage device 1018 may have been shipped originally with the set-top box 1012 or may have been downloaded previously from another source and stored on storage 1018.

In one embodiment, set-top box 1012 may be configured as a digital set top box for use with a satellite receiver or satellite integrated decoder/receiver that is capable of decoding MPEG video, audio, and data. For example, set top box 1012 may be configured to receive digital video channels that support broadband communications using Quadrature Amplitude Modulation (QAM) and to control channels for two-way signaling and messaging. The digital QAM channels may carry compressed and encoded multiprogram MPEG (Motion Picture Expert Group) transport streams. Transport stage 1028 extracts the desired program from the transport stream and separates the audio, video, and data components, which are routed to devices that process the streams, such as one or more audio decoders, one or more video decoders, and optionally to RAM (or other form of memory) or a hard drive. It is to be understood that the set top box 1012 and storage device 1018 (as well as any data and signals from the broadcast service provider) may be configured to accommodate analog, digital, or both analog and digital data.

Storage device 1018 is optionally coupled to the set top box 1012 and may be configured to store video, audio, executable code, meta-data, and other data. Storage device 1018 may be internal to set-top box 1012 or connected externally (e.g., through an IEEE 1394-1995 connection) with either a permanent connection or a removable connection. Further, storage device 1018 may comprise any suitable type of storage, such as a hard disk drive, a recordable DVD drive, magnetic tape, optical disk, magneto-optical disk, flash memory, or solid state memory. Further, more than one storage device 1018 may be attached to the set top box 1012. The set top box 1012 and/or storage device 1018 may further be incorporated into a television set. Executable data, such as program instructions, which is stored within storage device 1018 may be retrieved and executed. In one embodiment, retrieved data may be executed or otherwise utilized in synchronization with other applications or received signals, for example corresponding to a game show, commercial, or Internet based on-line game. Alternatively, retrieved data may be executed or utilized independently, such as for video-on-demand, banking, e-mail, or an electronic program guide (EPG).

It is to be understood that the set-top box 1012 and system 100 described herein are intended to be exemplary only. Broadcast network system 100 and set-top box 1012 may be different than described herein without departing from the scope of the invention. Further, various components depicted in the set top box 1012 of FIG. 9 may be combined, such as the placement of the integration of storage device 1018 within set top box 1012. Numerous alternatives are possible and are contemplated.

Relational Metadata Processing Engine

As discussed, relational metadata may be used to describe relationships between two or more sets of data. A viewer may be able to take advantage of this in order to enhance their viewing experience. As mentioned above, the RM processing engine may be implemented in software, although it may also be implemented in hardware either pre-installed, for example, or as part of a component that is inserted by the consumer. If implemented at least partly in software, any component of the software may be pre-installed or downloaded from a broadcast or from a location referenced through a locator in the broadcast.

In one embodiment, the RM processing engine may be configured by a viewer to perform in a particular manner. For example, a viewer may configure the RM engine to record a particular channel for one hour, but also record any corrections corresponding to that recording for the next eight hours. Alternatively, a viewer may configure the RM engine to record only summaries of news stories, excluding repeats, on a particular channel during the day. The RM engine may then utilize relational metadata which is received in order to complete a given task. Additionally, the RM engine may be configured to present, replay, and otherwise manipulate material which has been recorded. For example, a viewer may be able to see what has been recorded, select items for replay in a particular order, delete items, and so on. Still further, the RM engine may be configured to present interactive opportunities to a viewer when particular relational metadata is received. For example, in an embodiment which includes two tuners, while a viewer is watching a live broadcast on one channel, a sporting event on another channel may be concurrently recorded. Relational metadata indicating the availability of highlights of the event being recorded may be conveyed as those highlights are broadcast. In response to receiving the relational metadata, the RM engine may be configured to display an icon indicating the availability of the highlight. In response, a viewer may select the icon in order to display the highlight in a smaller window on the television display.

Still further, the RM engine may be configured to store relational metadata as well as corresponding programs and data. Storing relational metadata, or corresponding information, may allow the RM engine to take some action subsequent to the recording of programming material. For example, a viewer may begin replay of a series of summaries which were previously recorded. During replay of a particular summary, the RM engine may indicate that a more detailed version of the story is also available. The viewer may then select the more detailed version for immediate viewing if desired. Additionally, a viewer may configure the RM engine to perform some action at a later time, such as search for and delete redundant data from the storage device during the middle of the night. Numerous such uses are possible and contemplated for the use of relational metadata to enhance a viewers control over, and enjoyment of, received programming and other data.

Figure 10:
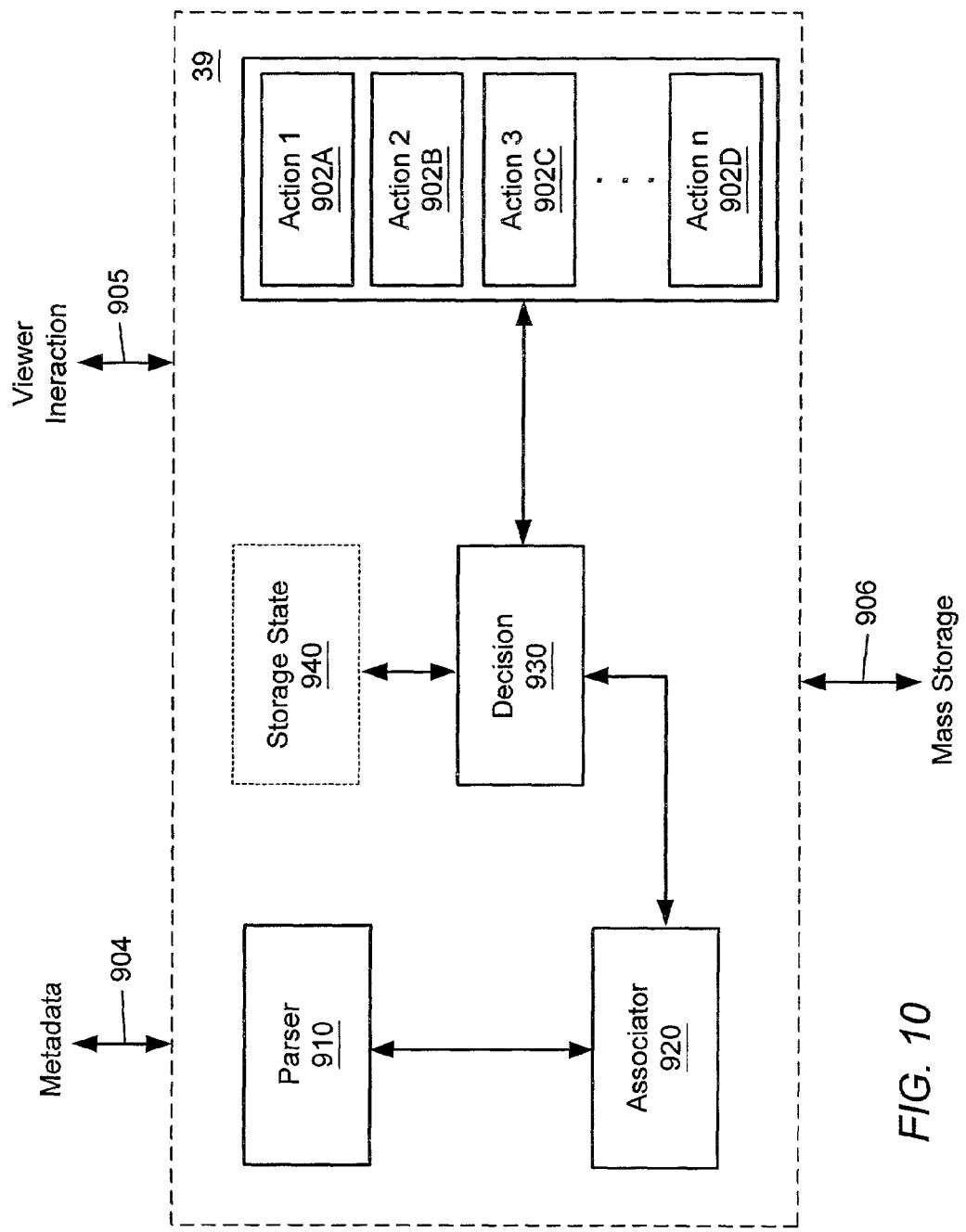
FIG. 10 is a block diagram of one embodiment of a relational metadata processing engine.

Turning now to FIG. 10, one embodiment of an RM processing engine 39 is shown. In the embodiment shown, the RM processing engine 39 includes a parser 910, an associator 920, a decision engine 930, and one or more action engines 902. Included among the action engines 902 may be an automatic recorder, an automatic deleter, an RM selector interaction engine, as well as others. Also illustrated is an optional storage state 940 which maintains information about data which is currently stored on a coupled mass storage device. In one embodiment, RM engine 39 may be configured to access mass storage 906 on power-up, determine the current state of data which is stored therein, and maintain and update a data structure 940 in memory which describes that state. It should be understood that the above-described components may be implemented as different modules within a single process, as an integrated whole, or as any combination thereof. They may also be further subdivided into more components. If implemented as multiple modules, they may be instantiated as separate threads within a single executing program, or as separate programs that communicate with one another or are placed together in a single thread of an executing program.

Generally speaking, RM engine 39 is configured to receive data 904, including relational metadata. Additionally, RM engine 39 may be configured to detect user input 905, access memory within a client, communicate with a control unit, and access mass storage 906. Parser 910 is configured to parse received data 904 and identify relational metadata included therein. In response to parsing and detecting relational metadata, parser 910 conveys data corresponding to the detected relational metadata instructions to associator 920. Associator 920 is configured to associate the relational metadata instructions with corresponding streams, which may comprise video streams, audio streams, executable data, etc. In addition, associator 920 may be configured to determine the semantics of the received relational metadata. In one embodiment, the meaning associated with a particular relational metadata instruction, or element of an instruction, may be changed dynamically via a software update. Advantageously, a consistent syntax may be utilized in creating relational metadata even as enhanced functionality associated with a particular relational metadata instruction is developed. Subsequent to determining the semantics associated with relational metadata, associator 920 conveys corresponding data to decision unit 930. Decision unit 930 may then initiate some action based on the received relational metadata and the current configuration of the RM engine 39. For example, in response to detecting that a Repeat 304 relational metadata instruction has been received, decision unit 930 may be configured to determine whether (i) the RM engine 39 is configured to record data corresponding to the data indicated by the Repeat instruction; (ii) if so, has the corresponding data already been recorded; and (iii) if the corresponding data has not already been recorded, initiate an appropriate action 902 in order to obtain and record the corresponding data. In one embodiment, decision unit 930 may access storage state 940 in order to determine whether the corresponding portion has already been recorded. Alternatively, an access to mass storage 906 may be made in order to make that determination.

FIGS. 11 and 12 illustrate various embodiments of an interface for use by a viewer which may be used to interact with RM engine 39. FIG. 11A illustrates a display 300 showing a television programming grid. The grid includes a column 1140 indicating different programming channels and a row 1142 indicating different programming time slots. Entries within the grid show television programs which are scheduled for the corresponding time and channel. For example, a program 1144 entitled "Local News" is scheduled for broadcast from 7:00-8:00 on the ALL NEWS channel. Utilizing a remote control or other device, a viewer may highlight a particular entry in the grid for information regarding the highlighted program. Further, the viewer may select the highlighted entry by pressing a button, for example. Numerous methods for maneuvering among and selecting entries in a television grid are possible and are contemplated.

FIG. 11B illustrates one embodiment of a display 1102 for use in configuring an RM engine. In one embodiment, display 1102 may be displayed in response to a viewer selecting the "Local News" program 1144 of programming grid 300 shown in FIG. 11A. Display 1102 includes a Selection section 1150 which indicates the title and channel of the current selection. Also included is an Options section 1160 which provides various options for configuring the RM processing engine. In the embodiment shown, six options 1170A-1170F are illustrated. Associated with each option 1170 are two check boxes which may be used to indicate whether the viewer desires that the corresponding option be enabled ("Yes") or disabled ("No").

Option 1170A is used to indicate whether the current selection 1150 is to be recorded. If the selection is to be recorded, a corresponding date and time 1175 may also be provided. Option 1170B is used to indicate a desire to record any available summary, in addition to the corresponding program. Option 1170C is used to indicate that only summaries corresponding to the current selection are to be recorded. Option 1170D is used to indicate the corrections corresponding to the current selection are to be recorded as well. If corrections are to be recorded, a period of time 1177 may also be entered to indicate how long the RM engine is to look for corresponding corrections after expiration of the current selection. For example, a viewer may indicate that any corrections which are received during the 12 hours following the initial recording are to be recorded. Option 1170E is used to indicate whether received portions which include more detail than the original are to be recorded. Finally, option 1170F may be used to indicate whether repeated data is to be recorded.

FIG. 11C illustrates an alternative exemplary embodiment of a display which may be used to make recording selections. While FIG. 11B illustrated the selection of a news program and a variety of recording options, FIG. 11C illustrates an embodiment in which the type of selection made may be detected and corresponding recording options presented. Display 1180 in FIG. 11C shows options subsequent to selecting a sporting event for recording. In addition to a title and channel, section 1182 also indicates the type of program which is selected. In the example of FIG. 11C, a professional American style football game has been selected. Selection options 1184A-1184J may be seen to correspond to the type of event selected. Option 1184A allows a viewer to indicate whether or not this event is to be scheduled for recording. As in FIG. 11B, check boxes are utilized to indicate which options are enabled. Option 1184B is used to indicate that the entire game is to be recorded. Other options available allow a viewer to indicate whether particular items are to be recorded, including summaries 1184C, scoring events 1184D, penalties and nullified plays 1184E, halftime entertainment 1184F, interceptions 1184G, and replays 1184H.

In addition to the above options, further options are provided which may include utilizing relational metadata to post process already recorded data. For example, while option 1184I indicates that the entire game and all recorded options are to be retained, option 1184J indicates only the options are to be retained. In one embodiment, subsequent to recording the entire game and all selected optional material, the relational metadata is used to remove from storage the material which is not desired. In the example shown, options 1184B, 1184C, 1184D, 1184G, and 1184J are selected for recording. In one embodiment, a textbox 1186 may be included which dynamically builds a natural language description of the viewer's current selection. In the example shown, the viewer's selection is to "Record the eagles vs. bears game, including any summaries, scoring events, and interceptions. Do not record penalties and nullified plays, halftime entertainment, or replays. Then trim down to just the summaries, scoring events and interceptions." Consequently, after the game recording is complete, all but the summaries, scoring events and interceptions is deleted. Various embodiment may include relocating the retained material to a contiguous area of storage space, configuring the retained material so that it may be replayed in a continuous manner, or personally configuring how the remaining material is to be replayed as will be discussed in FIG. 12B.

Also shown in the embodiment of FIG. 11C, are an indication of how much space is available 1190 on a storage device and how much is predicted to be needed to store the current selection 1192. Other options 1188 may be available as well. In addition, embodiments may also include permitting a viewer to set a default configuration or profile on how particular events, or types of events, are to be recorded. In this manner, a viewer may select various features of an event for recording, without going through menus, selection options, or other configuration each time.

FIG. 12A illustrates one embodiment of a display 1200 which may be used in conjunction with an RM processing engine. Display 1200 shows a television programming grid. Included in the display 1200 are icons 1210, 1215, and 1220. Icons 1210 and 1220 indicate the presence of Personalized Content (PC) on a coupled storage device (e.g., coupled to a set-top box which is coupled to the display). Personalized Content represents content which has been previously recorded. In one embodiment, icon 1210 may be selected by a viewer in order to show all content which has been stored. Icon 1220 may be selected to show only content which has been recorded which corresponds to the ALL NEWS channel. Icon 1215 may be used to indicate that the RM engine is currently configured to perform some action corresponding to the channel ABC.

FIG. 12B illustrates one embodiment of a display 1202 which is shown in response to selecting icon 1220. Display 1202 includes a section 1250 showing the title and channel of the current selection, as well as the time and time at which the stored content was recorded. Also displayed is a list of distinguishable items 1262A-1262D which are contained in the recorded content. In the example shown, four news stories 1262 are shown as corresponding to the selected recording. Each item 1262 also includes a title 1280. Also associated with each item are four check boxes which may be used by a viewer to indicate certain preferences. A first check box 1260 entitled "View" allows a viewer to indicate the selected item is to be played from the recording. A second check box 1270 entitled "View Summary Only" allows a viewer to indicate that only a summary is to be played. In the example shown, the absence of a summary only checkbox 1270 may indicate no summary is available for that item. A Delete check box 1290 is also included for each item 1262. In the embodiment shown, a viewer may indicate that the corresponding item is to be deleted after viewing ("After View") or without viewing ("Now"). In addition to indicating that certain items are to be played, a viewer may also indicate the order in which they are to be played by entering the appropriate number in the corresponding check box. For example, item 1262C is to be viewed first "1", item 1262A is to be viewed second "2", and a summary of item 1262D is to be viewed third "3". In this manner a viewer may not only select the stories to be watched and the amount of detail to be included in each, but also the order in which they are to be played.

In addition to the above, FIG. 12B presents further exemplary options 1292 from which a viewer may choose. Option 1292A allows a viewer to play only those items which have been selected for play, option 1292B permits a viewer to simply being playing all recorded material, option 1292C permits a viewer to begin playing all recorded summaries, option 1292D allows a viewer to return to the program guide, and option 1292E returns a viewer to a main menu. Advantageously, a viewer may create their own personalized programming. All of the above examples are to be understood as being exemplary only. Numerous alternatives are possible and are contemplated.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as network and/or a wireless link. For example, a network operator may convey signals which describe program instructions via a broadcast system. A carrier medium may also include storage media or memory media such as magnetic or optical media, e.g., disk or CD-ROM, volatile or non-volatile media such as RAM (e.g. SDRAM, RDRAM, SRAM, etc.), ROM, etc.

While the present invention has been described with reference to particular embodiments, it will be understood that the embodiments are illustrative and that the invention scope is not limited to these embodiments. For example, while discussed in terms of television systems, the invention may also be used in the context of a device coupled to the Internet, such as a personal computer or video game platform. In such an embodiment, a user may have a broadband connection to the Web, such as via cable modem or DSL whereby programs, interactive applications and scripts are received. Further, rather than utilizing a remote control, a user may use a mouse, voice recognition apparatus, or other device to convey an indication. Many variations, modifications, additions and improvements to the embodiments described are possible. These variations, modifications, additions and improvements may fall within the scope of the invention as detailed within the following claims.

What is claimed is:

1. A method for processing relational metadata in a television system, the method comprising:

receiving at a client device at least one relational metadata instruction via a television programming signal, wherein the relational metadata instruction includes at least a relationship identifier and a dataset element, wherein said relationship identifier specifies a type of relationship between a first data and a second data, and wherein the dataset element identifies the second data;

identifying an action corresponding to the relational metadata instruction; and initiating the action in response to the identifying; wherein the relationship of the second data to the first data is selected from the group consisting of: a summary, a correction, a repeat, a highlight, more detailed content, related text, and a related icon.

2. The method of claim 1, wherein the first data and the second data each comprise content configured for audio and/or visual presentation.

3. The method of claim 2, further comprising receiving the broadcast signal, wherein the first data is included in the broadcast signal, and wherein the relational metadata instruction is received subsequent to the first data.

4. The method of claim 3, wherein the relational metadata instruction does not explicitly identify the first data.

5. The method of claim 2, wherein the second data is received subsequent to the first data and is a subset of the first data.

6. The method of claim 1, further comprising conveying a request and receiving the second data in response to the request.

7. The method of claim 1, wherein the action comprises presenting an icon responsive to detecting the relational metadata instruction.

8. The method of claim 1, wherein the action comprises recording at least a portion of the content identified by the relational metadata instruction on a mass storage device.

9. The method of claim 1, further comprising associating the action with the relational metadata instruction, and wherein the initiating is in further response to determining the association.

10. The method of claim 1, further comprising providing an interface which enables a viewer to specify what types of received data are to be recorded in response to detecting the relational metadata instruction.

11. A device for processing relational metadata comprising a metadata processing engine, wherein the engine is configured to:
   detect relational metadata instructions, wherein each of the relational metadata instructions includes at least a relationship identifier and a dataset element, wherein said relationship identifier specifies a type of relationship between a first data and a second data, and wherein the dataset element identifies the second data;
   identify an action corresponding to a relational metadata instruction; and
   initiate the action in response to the identifying; wherein the relationship of the second data to the first data is selected from the group consisting of: a summary, a correction, a repeat, a highlight, more detailed content, related text, and a related icon.

12. The device of claim 11, further comprising a signal receiver configured to receive a broadcast signal, wherein the first data is included in the broadcast signal, and wherein the relational metadata instruction is received subsequent to receiving the first data.

13. The device of claim 12, wherein the processing engine is configurable to associate the action with the relational metadata instruction.

14. The device of claim 11, wherein the processing engine is further configured to generate and convey a request corresponding to the second data, wherein the second data is subsequently received by the device in response to the request.

15. The device of claim 11, wherein the device is configured to provide an interface which enables a viewer to specify what types of received data are to be recorded in response to detecting relational metadata instruction.

16. A relational metadata processing engine comprising:
   a parsing unit, wherein the parsing unit is configured to parse a relational metadata instruction, wherein the relational metadata instruction includes at least a relationship identifier and a dataset element, wherein said relationship identifier specifies a type of relationship between a first data and a second data, and wherein the dataset element identifies the second data;
   an association unit, wherein the association unit is configured to associate the relational metadata instruction with a first type of relational metadata; and
   a decision unit configured to convey an indication initiating an action in response to detecting the relational metadata instruction; wherein the relationship of the second data to the first data is selected from a group consisting of: a summary, a correction, a repeat, a highlight, more detailed content, related text, and a related icon.

17. The processing engine of claim 16, further comprising an action unit configured to take the action in response to detecting the indication.

18. The processing engine of claim 17, wherein the engine is configurable to associate the action with the relational metadata instruction.

19. The processing engine of claim 18, wherein the action comprises recording the second data on a storage device, and wherein the decision engine is configured to access the storage device to determine whether the second data has already been recorded.

20. The processing engine of claim 16, wherein the engine is further configured to provide an interface which enables a viewer to specify what types of received data are to be recorded in response to detecting the relational metadata instruction.

21. The processing engine of claim 20, wherein the first data is included in a broadcast signal, and wherein the relational metadata instruction is received subsequent to broadcast of the first data.

22. A television system for processing relational metadata comprising:
   a first source for conveying a programming signal; and
   a second source for conveying relational metadata corresponding to the programming signal, wherein the relational metadata includes a relational metadata instruction with at least a relationship identifier and a dataset element, wherein said relationship identifier specifies a type of relationship between a first data and a second data, and wherein the dataset element identifies the second data, and wherein the relational metadata instruction is configured to provide input to a relational metadata processing engine which is configured to initiate an action based on the input; wherein the relationship of the second data to the first data is selected from a group consisting of: a summary, a correction, a repeat, a highlight, more detailed content, related text, and a related icon.

23. The system of claim 22, further comprising a client configured to receive the programming signal, wherein the client comprises the relational metadata processing engine.

24. The system of claim 22, wherein the first source and the second source are not located in a common location.

25. The system of claim 22, further comprising a third source configured to convey the second data subsequent to conveyance of the programming signal.

26. The system of claim 25, wherein the third source is configured to convey the second data in response to a request initiated by a viewer.

27. A computer readable storage medium comprising program instructions, wherein the program instructions are executable to:
   receive relational metadata corresponding to a broadcast signal, wherein the relational metadata includes a relational metadata instruction with at least a relationship identifier and a dataset element, wherein said relationship identifier specifies a type of relationship between a first data and a second data, and wherein the dataset element identifies the second data;

identify an action corresponding to the relational metadata instruction; and initiate the action in response to the identifying; wherein the relationship of the second data to the first data is selected from the group consisting of: a summary, a correction, a repeat, a highlight, more detailed content, related text, and a related icon.

28. The computer readable storage medium of claim 27, wherein the first data and the second data each comprise content configured for audio and/or visual presentation.

29. The computer readable storage medium of claim 27, wherein the first data is included in the broadcast signal, and wherein the relational metadata instruction is received subsequent to the first data.

30. The computer readable storage medium of claim 29, wherein the program instructions are further executable to convey a request for conveyance of the second data and receive the second data in response to the request.

31. The computer readable storage medium of claim 27, wherein the action comprises presenting an icon responsive to detecting relational metadata instruction.

32. The computer readable storage medium of claim 27, wherein the action comprises recording a portion of the content identified in the metadata on a mass storage device.

33. The computer readable storage medium of claim 27, wherein the program instructions are further executable to associate the action with the relational metadata instruction, and wherein the initiating is in further response to detecting the association.

34. The computer readable storage medium of claim 27, wherein the program instructions are further executable to provide an interface which enables a viewer to specify what types of received data are to be recorded in response to detecting the relational metadata instruction.

35. A method for processing relational metadata comprising:

parsing relational metadata, wherein the relational metadata includes a relational metadata instruction with at least a relationship identifier and a dataset element, wherein said relationship identifier specifies a relationship between a first data and a second data, and wherein the dataset element identifies the second data;

associating the relational metadata instruction with a first type of relational metadata instruction; and deciding on a first action corresponding to said relational metadata; wherein the relationship of the second data to the first data is selected from the group consisting of: a summary, a correction, a repeat, a highlight, more detailed content, related text, and a related icon.

36. The method of claim 35, further comprising conveying an indication initiating said action in response to the decision.

37. The method of claim 36, further comprising providing an interface which enables a viewer to specify what types of received data are to be recorded in response to detecting relational metadata.

38. A method for processing relational metadata in a television system, the method comprising:

receiving at a client device at least one relational metadata instruction via a television programming signal, wherein the relational metadata instruction includes at least a relationship identifier and a dataset element, wherein said relationship identifier specifies a type of relationship between a first data and a second data, and wherein the dataset element identifies the second data;

identifying an action corresponding to the relational metadata instruction; and initiating the action in response to the identifying;

wherein the relational metadata instruction identifies content which is stored on a mass storage device, and wherein the action comprises deleting a portion of the identified content from the mass storage device.

39. A device for processing relational metadata comprising a metadata processing engine, wherein the engine is configured to:

detect relational metadata instructions, wherein each of the relational metadata instructions includes at least a relationship identifier and a dataset element, wherein said relationship identifier specifies a type of relationship between a first data and a second data, and wherein the dataset element identifies the second data;

identify an action corresponding to a relational metadata instruction; and initiate the action in response to the identifying;

wherein the action comprises deleting content identified by the relational metadata instruction from a mass storage device.

40. A computer readable storage medium comprising program instructions, wherein the program instructions are executable to:

Receive relational metadata corresponding to a broadcast signal, wherein the relational metadata includes a relational metadata instruction with at least a relationship identifier and a dataset element, wherein said relationship identifier specifies a type of relationship between a first data and a second data, and wherein the dataset element identifies the second data;

identifying an action corresponding to the relational metadata instruction; and initiate the action in response to the identifying;

wherein the action comprises deleting a portion of the content identified by the relational metadata instruction from a mass storage device.

* * * * *